US012391304B2

(12) United States Patent
Shin

(10) Patent No.: US 12,391,304 B2
(45) Date of Patent: Aug. 19, 2025

(54) STEERING DEVICE FOR VEHICLE

(71) Applicant: HL Mando Corporation, Pyeongtaek-si (KR)

(72) Inventor: JunHo Shin, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 744 days.

(21) Appl. No.: 17/710,193

(22) Filed: Mar. 31, 2022

(65) Prior Publication Data
US 2022/0324508 A1 Oct. 13, 2022

(30) Foreign Application Priority Data
Apr. 13, 2021 (KR) .................. 10-2021-0048017

(51) Int. Cl.
*B62D 5/04* (2006.01)
*F16H 7/18* (2006.01)
*F16H 57/035* (2012.01)

(52) U.S. Cl.
CPC ......... *B62D 5/0448* (2013.01); *B62D 5/0424* (2013.01); *F16H 7/18* (2013.01); *F16H 57/035* (2013.01)

(58) Field of Classification Search
CPC ...... B62D 5/0448; B62D 5/0424; B62D 5/04; B62D 5/0403; B62D 3/02; F16H 7/18; F16H 57/035; F16H 25/2204; F16H 2025/2081; F16H 2025/2096; F16H 55/171
USPC ........................................................ 180/444
See application file for complete search history.

(56) References Cited

U.S. PATENT DOCUMENTS

| 2004/0043854 | A1* | 3/2004 | Fraley, Jr. ........... | B62D 5/0424 474/134 |
| 2007/0095600 | A1* | 5/2007 | Jo ....................... | B62D 5/0424 180/444 |
| 2019/0161110 | A1* | 5/2019 | Lee .................... | F16H 57/0006 |

FOREIGN PATENT DOCUMENTS

| CN | 101024402 A | 8/2007 | |
| CN | 102963417 A | 3/2013 | |
| CN | 103161900 A | 6/2013 | |
| CN | 108533703 A | 9/2018 | |
| CN | 110371183 A | 10/2019 | |
| CN | 111108034 A | 5/2020 | |
| DE | 102005025063 A1 * | 12/2006 | ......... B62D 5/0412 |
| JP | S60-57041 A | 4/1985 | |
| JP | H9-4686 A | 1/1997 | |
| JP | 2005-29145 A | 2/2005 | |
| KR | 10-2007-0042632 A | 4/2007 | |

(Continued)

OTHER PUBLICATIONS

Chinese Office Action issued on Nov. 29, 2023, in connection with the Chinese Patent Application No. 202210355371.6, 13 pages, with English machine translation.

(Continued)

*Primary Examiner* — Jacob D Knutson
(74) *Attorney, Agent, or Firm* — Hauptman Ham, LLP

(57) ABSTRACT

A steering device for a vehicle includes a ball nut coupled with a nut pulley; a motor provided with a motor pulley connected with the nut pulley through a belt; a housing receiving the nut pulley, the belt, and the motor pulley; and a plurality of supports protruding from an inner circumferential surface of the housing to prevent the belt from jumping off the motor pulley.

8 Claims, 7 Drawing Sheets

(56) References Cited

FOREIGN PATENT DOCUMENTS

KR        20170031342 A  *  3/2017  ........... B62D 5/0424
KR   10-2017-0050002 A     5/2017

OTHER PUBLICATIONS

Chinese Notice of Allowance issued on Mar. 14, 2024, in connection with the Chinese Patent Application No. 202210355371.6, with partial English translation (6 pages).

Jian-bin Zhou et al., "Wheel set drive system of bogie on type HXD1 locomotive", Electric Locomotives & Mass Transit Vehicles, vol. 31, No. 1, Jan. 20, 2008, 12 Pages, With English machine translation.

* cited by examiner

STEERING DEVICE FOR VEHICLE

CROSS-REFERENCE TO RELATED APPLICATION

This application claims priority from Korean Patent Application No. 10-2021-0048017, filed on Apr. 13, 2021, which is hereby incorporated by reference for all purposes as if fully set forth herein.

BACKGROUND

Field

The present embodiments relate to a steering device for a vehicle and, more particularly, to a steering device for a vehicle that may ensure normal steering and driver safety by preventing jumping without proper engagement between the teeth of the pulley and the belt.

Description of Related Art

The rack-driven power assist steering system or steer-by-wire steering system includes a ball screw having two opposite ends connected with a tie rod and a knuckle arm, a ball nut coupled with the ball screw via balls, and a motor for rotating the ball nut. The steering device assists the driver in steering or steers the vehicle based on the driver's steering wheel manipulation information The motor and the ball nut are connected by a belt. In other words, the torque of the motor is transferred to the ball nut as the motor pulley of the motor shaft and the nut pulley of the ball nut are connected by the belt.

The gear teeth of the belt may jump off the gear teeth of the motor pulley due to external impact while steering. Such jump occurs, the motor shaft may idle, cutting off power transfer to the ball screw and failing to control the ball screw. Further, although the belt and the motor pulley are engaged back with each other, the axial position of the ball screw may not be precisely determined, so that the driver may be put at risk of an accident.

BRIEF SUMMARY

The present embodiments have been conceived in the foregoing background and relate to a steering device for a vehicle that may ensure normal steering and driver safety by preventing jumping without proper engagement between the teeth of the pulley and the belt.

According to the present embodiments, there may be provided a steering device for a vehicle, comprising a ball nut coupled with a nut pulley, a motor provided with a motor pulley connected with the nut pulley through a belt, a housing receiving the nut pulley, the belt, and the motor pulley, and a support protruding from an inner circumferential surface of the housing to prevent the belt from jumping off the motor pulley.

According to the present embodiments, it is possible to ensure normal steering and the driver's safety by preventing jumping without proper engagement between the teeth of the pulley and the belt.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

Figure 1:
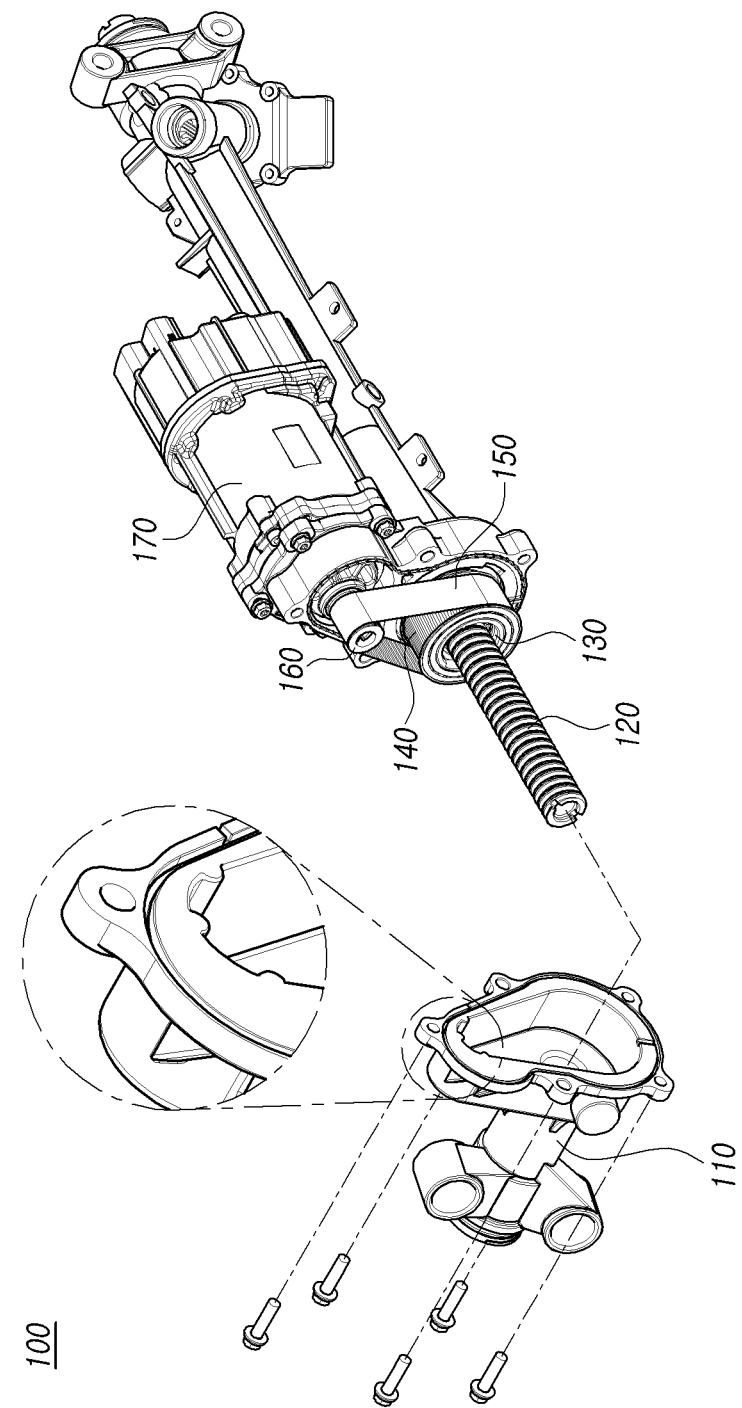
FIG. 1 is an exploded perspective view illustrating a steering column for a vehicle according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
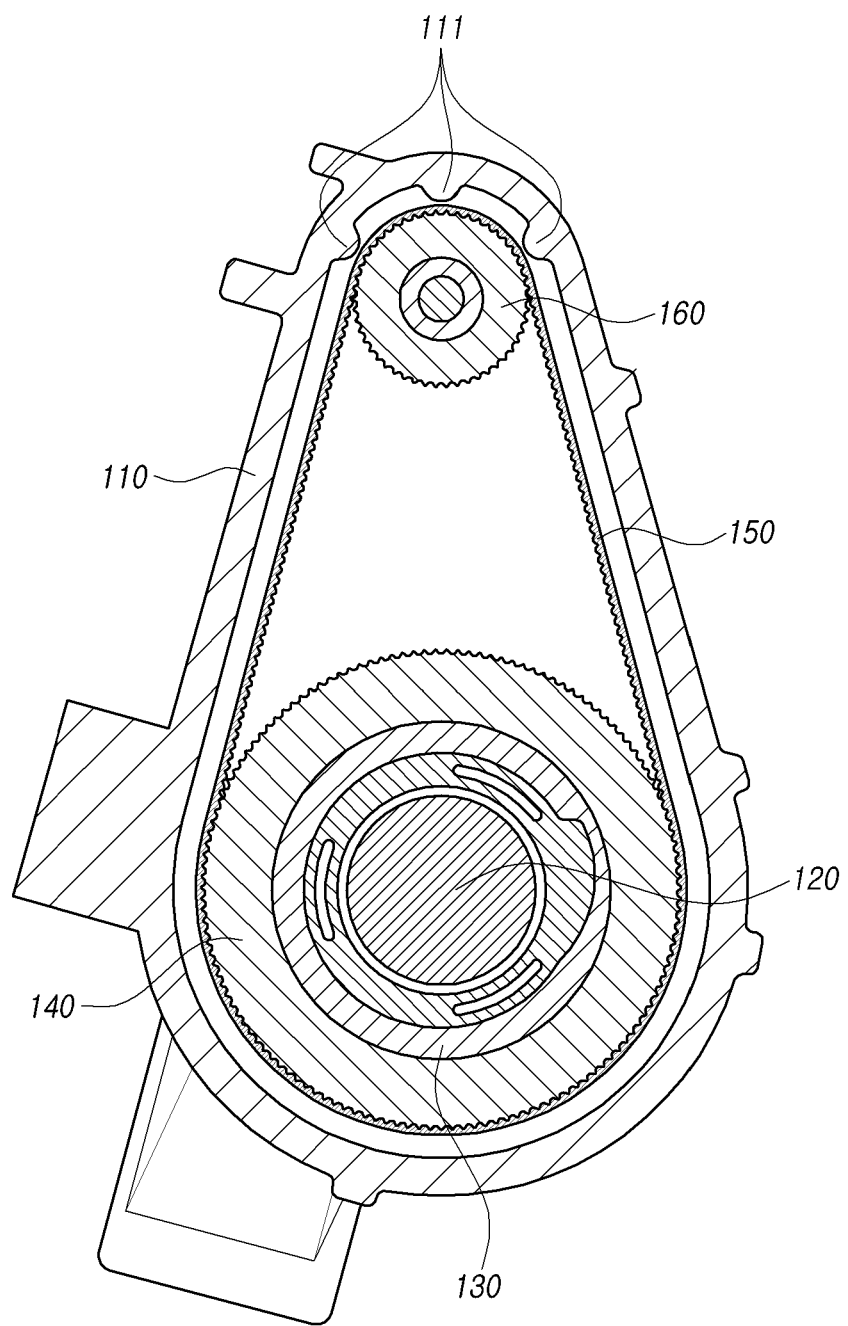
FIG. 2 is a cross-sectional view illustrating an assembled state of FIG. 1.
Figure 3:
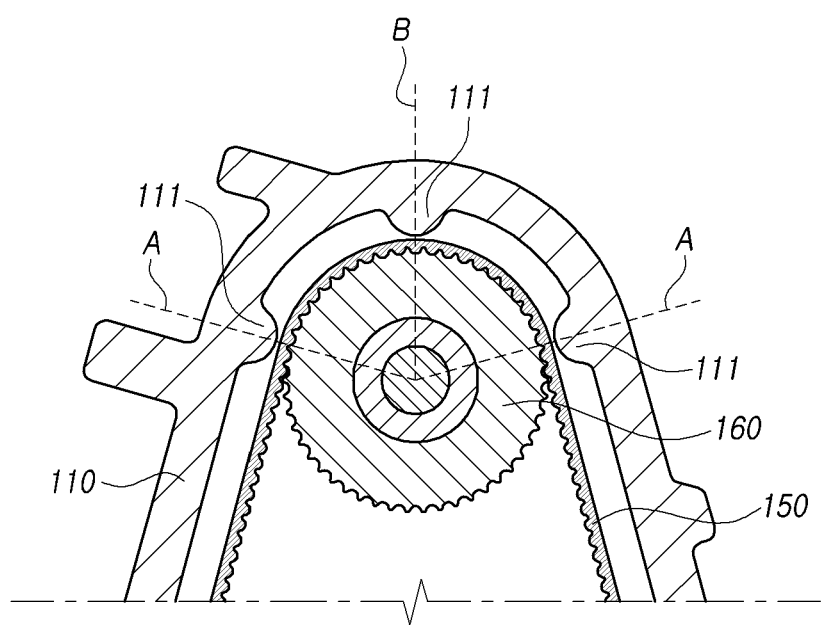
FIG. 3 is a view illustrating a portion of FIG. 2.
Figure 4:
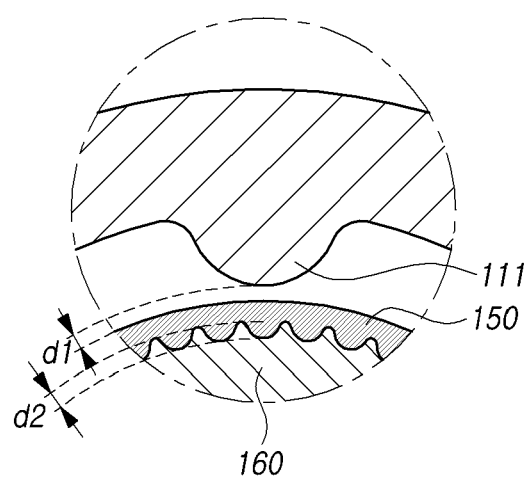
FIG. 4 is an enlarged view illustrating a portion of FIG. 3.
Figure 5:
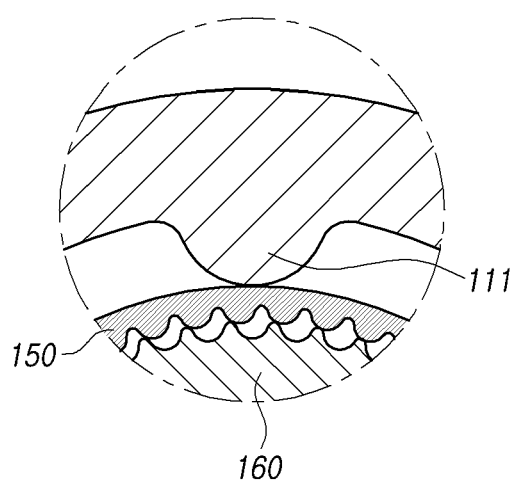
FIG. 5 is a view illustrating a state of the belt being prevented from jumping in FIG. 4.
Figure 6:
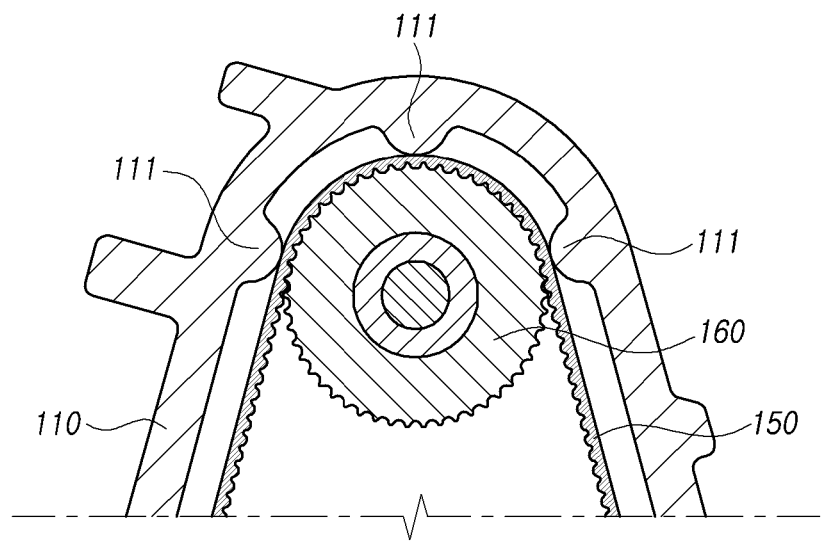
FIGS. 6 and 7 are cross-sectional views illustrating a portion of a steering device of a vehicle according to the present embodiments.
Figure 7:
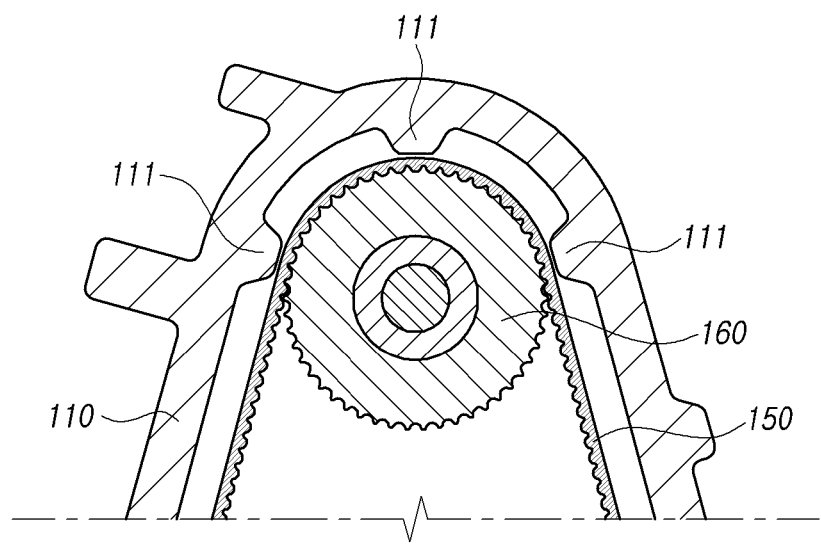

FIG. 1 is an exploded perspective view illustrating a steering column for a vehicle according to the present embodiments. FIG. 2 is a cross-sectional view illustrating an assembled state of FIG. 1. FIG. 3 is a view illustrating a portion of FIG. 2. FIG. 4 is an enlarged view illustrating a portion of FIG. 3. FIG. 5 is a view illustrating a state of the belt being prevented from jumping in FIG. 4. FIGS. 6 and 7 are cross-sectional views illustrating a portion of a steering device of a vehicle according to the present embodiments.

According to the present embodiments, a steering device 100 of a vehicle includes a ball nut 130 coupled with a nut pulley 140, a motor 170 provided with a motor pulley 160 connected with the nut pulley 140 through a belt 150, a housing 110 receiving the nut pulley 140, the belt 150, and the motor pulley 160, and a support 111 protruding from an inner circumferential surface of the housing 110 to prevent the belt 150 from jumping off the motor pulley 160.

Referring to FIGS. 1 and 2, the motor pulley 160 of the motor 170 and the nut pulley 140 of the ball nut 130 are connected with each other through the belt 150 so that the ball nut 130 is rotated by the motor 170. Accordingly, a ball screw 120 coupled with the ball nut 130 via a ball is axially moved.

On the inner circumferential surface of the belt 150 are formed gear teeth engaged with the gear teeth of the motor pulley 160 and the nut pulley 140. Accordingly, as the belt 150 is rotated, the torque of the motor 170 is transferred to the ball nut 130 and the ball screw 120.

Two opposite ends of the ball screw 120 are connected with, e.g., tie rods and knuckle arms. Accordingly, the wheels are steered by the axial movement of the ball screw 120.

In other words, the torque of the motor 170 is converted and the ball screw 120 is axially moved. Accordingly, an electronic control unit provided in the vehicle may assist the driver's manipulation of the steering wheel by controlling the motor 170 or steer the wheel in response to the driver's manipulation of the steering wheel.

A slip may occur between the belt 150 and the motor pulley 160 or nut pulley 140. The slip may cause jumping between the gear teeth of the belt 150 and the gear teeth of the motor pulley 160 or the gear teeth of the nut pulley 140. If jumping occurs, power transfer between the motor 170 and the ball screw 120 may be cut off, leading to failure in assisting the driver's steering or in a worst scenario case, rendering it impossible to steer the vehicle and causing an accident.

Further, although the gear teeth are engaged back after jumping occurs, a phase difference occurs between the motor pulley 160 and the nut pulley 140 as compared between before and after jumping. As a result, it may be impossible to precisely determine the position of the ball screw 120, leaving an error in control of the motor 170 by the electronic control unit and causing an accident.

Therefore, it is critical to prevent a slip between the belt 150 and the motor pulley 160 or nut pulley 140. The conventional steering device has a broad contact surface between the belt and the nut pulley and is thus less likely to cause a slip. However, since the contact surface between the belt and the motor pulley is relatively narrow, a slip is highly likely.

According to the disclosure, the belt 150 may be prevented from jumping off the motor pulley 160 by the support 111 protruding from the inner circumferential surface of the housing 110 receiving the nut pulley 140, the belt 150, and the motor pulley 160. Accordingly, it is possible to ensure normal steering and the driver's safety.

Referring to FIG. 3, the support 111 protrudes from the inner circumferential surface of the housing so that an end thereof faces an outer surface of the belt 150.

Therefore, as is described below, when the gear teeth of the belt 150 and the gear teeth of the motor pulley 160 fail to be normally engaged and jump off, the outer surface of the belt 150 is supported by the end of the support 111, preventing jumping.

The support 111 may be formed in a portion, surrounding the motor pulley 160, of the inner circumferential surface of the housing. In other words, the belt 150 is positioned between the end of the support 111 and the outer circumferential surface of the motor pulley 160. Accordingly, when the gear teeth of the belt 150 and the gear teeth of the motor pulley 160 are going to jump off while having a gap therebetween, the end of the support 111 supports the outer surface of the belt 150, restricting the gap growing and preventing jumping.

The number of supports 111 is not limited to a specific number, and one or more supports 111 may be provided. There may be provided a plurality of supports 111. If a plurality of supports 111 are provided, the supports 111 may be spaced apart from each other to effectively prevent the belt 150 from jumping.

Further, supports 111 may be provided in first positions A facing two opposite ends of the portion of the belt 150 contacting the motor pulley 160. In other words, the outer surfaces of the portion of the belt 150, starting to engage with the motor pulley 160, and the portion of the belt 150, starting to disengage from the motor pulley 160, may face the supports 111 in the first positions A.

Accordingly, specifically, it is possible to prevent jumping at the portion where the belt 150 and the motor pulley 160 engage with or disengage from each other. In particular, it is possible to prevent jumping while the rotation direction of the motor pulley 160 is changed.

A support 111 may also be provided in a second position B facing the center of the portion of the belt 150 contacting the motor pulley 160. In other words, the outer surface of the portion of the belt 150 engaged with the motor pulley 160 may face the support 111 in the second position B.

Accordingly, it is possible to prevent jumping while the belt 150 is rotated in any one direction by the motor pulley 160.

As shown in the drawings, supports 111 may be provided in all of the positions A and B. Thus, while the belt 150 is rotated by the motor 170, the engagement between the belt 150 and the motor pulley 160 may remain stable.

To prevent the belt 150 from jumping by the support 111, the support 111 may be formed so that an end thereof is positioned adjacent to the outer surface of the belt 150. Accordingly, the gap between the end of the support 111 and the outer surface of the belt 150 may be formed to be smaller than the height of the gear teeth of the motor pulley 160.

FIG. 4 illustrates a state in which the belt 150 and the motor pulley 160 are normally engaged with each other. FIG. 5 illustrates a state in which the belt 150 is prevented from jumping by the support 111.

As illustrated in FIG. 4, in the state in which the belt 150 and the motor pulley 160 are normally engaged with each other, the end of the support 111 and the outer surface of the belt 150 may be spaced apart from each other, leaving a gap d1 therebetween. The gap d1 is formed to be smaller than the height d2 of the gear teeth of the motor pulley 160 (d1<d2).

Accordingly, as illustrated in FIG. 5, if the gear teeth of the belt 150 ride on the gear teeth of the motor pulley 160 and the mountains of the gear teeth are going to overlap as shown in FIG. 5, the outer surface of the belt 150 is supported by the end of the support 111, preventing the belt 150 from jumping.

As shown in FIG. 6, the end of the support 111 may be brought in contact with the belt 150. As the support 111 contacts the belt 150, it is possible to more reliably prevent the belt 150 from jumping. Given the assemblability of the belt 150 and the motor 170, a proper gap may be designed between the support 111 and the belt 150.

It is preferable to form the end of the support 111 to have a curved surface. Specifically, it is preferable to form the support 111 so that two opposite surfaces of the support 111 facing in the rotation direction of the belt 150 are curved surfaces. Referring to the drawings, it is preferable that two opposite surfaces of the support 111, not in the axial direction of the motor pulley 160 but in the direction perpendicular thereto, are curved surfaces. Accordingly, although the end of the support 111 is positioned adjacent to or in contact with the belt 150, it is possible to prevent collision to the support 111 in the rotation direction of the belt 150 while minimizing friction.

As shown in FIGS. 1 to 6, the end of the support 111 may be formed to be convex. For example, as shown in the drawings, the support 111 may be formed to have a substantially semi-circular cross section.

Alternatively, as shown in FIG. 7, the end of the support 111 may be formed to be concave. If the end of the support 111 is formed to be concave, the support 111 is allowed to face the outer surface of the belt 150 in a larger area as compared with when the end of the support 111 is formed to be convex, allowing for more reliable prevention from jumping.

In particular, the end of the support 111 may be formed in a shape complementary to its opposite portion of the belt 150. As shown in the drawings, the supports 111 in the first positions A may be formed to be partially flat and partially curved, and the support 111 in the second position B may be formed to have a curved surface which is deepest in the center.

By the so-shaped steering device for a vehicle, it is possible to ensure normal steering and the driver's safety by preventing jumping without proper engagement between the teeth of the pulley and the belt.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering device for a vehicle, comprising:
   a ball nut coupled with a nut pulley;
   a motor provided with a motor pulley connected with the nut pulley through a belt;
   a housing receiving the nut pulley, the belt, and the motor pulley; and
   a plurality of supports protruding from an inner circumferential surface of the housing to prevent the belt from jumping off the motor pulley,
   wherein the plurality of supports are formed in a portion, surrounding the motor pulley, of the inner circumferential surface of the housing, and
   wherein the plurality of supports are provided in a first position facing each of two opposite ends of the belt contacting the motor pulley and a second position facing a center of a portion of the belt contacting the motor pulley.

2. The steering device of claim 1, wherein each end of the plurality of supports faces an outer surface of the belt.

3. The steering device of claim 2, wherein a gap between the end of the support and the outer surface of the belt is smaller than a height of gear teeth of the motor pulley.

4. The steering device of claim 3, wherein the end of the support contacts the belt.

5. The steering device of claim 2, wherein the end of the support is formed to have a curved surface.

6. The steering device of claim 5, wherein the end of the support is formed to be convex.

7. The steering device of claim 5, wherein the end of the support is formed to be concave.

8. The steering device of claim 7, wherein the end of the support is formed in a shape complementary to an opposite portion of the belt.

* * * * *